(12) United States Patent
Mailloux

(10) Patent No.: US 11,198,371 B2
(45) Date of Patent: Dec. 14, 2021

(54) DUAL VOLTAGE RANGE CHARGING STATION

(71) Applicant: AddÉnergie Technologies Inc., Quebec (CA)

(72) Inventor: Daniel Mailloux, Lac-Beauport (CA)

(73) Assignee: AddÉnergie Technologies Inc., Québec (CA)

( * ) Notice: Subject to any disclaimer, the term of this patent is extended or adjusted under 35 U.S.C. 154(b) by 83 days.

(21) Appl. No.: 16/547,249

(22) Filed: Aug. 21, 2019

(65) Prior Publication Data

US 2020/0070674 A1 Mar. 5, 2020

Related U.S. Application Data

(60) Provisional application No. 62/725,351, filed on Aug. 31, 2018.

(51) Int. Cl.
*B60L 53/00* (2019.01)
*B60L 53/14* (2019.01)
(Continued)

(52) U.S. Cl.
CPC .............. *B60L 53/14* (2019.02); *B60L 53/11* (2019.02); *B60L 53/20* (2019.02); *B60L 53/53* (2019.02);
(Continued)

(58) Field of Classification Search
CPC ..... Y02T 10/92; Y02T 10/7072; Y02T 90/12; H02M 7/23; B60L 53/14; B60L 53/11; B60L 53/67; B60L 53/20
See application file for complete search history.

(56) References Cited

U.S. PATENT DOCUMENTS 4,451,865 A * 5/1984 Warner ................. H02H 11/00
361/114
6,664,762 B2 * 12/2003 Kutkut ..................... H02J 7/02
320/116
(Continued)

OTHER PUBLICATIONS

Canadian Intellectual Property Office, Office Action for Canadian Patent Application No. 3,052,825, dated Oct. 6, 2020.

*Primary Examiner* — Naum Levin
(74) *Attorney, Agent, or Firm* — Wiggin and Dana LLP; Gregory S. Rosenblatt; Brian A. Pattengale

(57) ABSTRACT

A power circuit for a dual voltage range charging station is disclosed. The power circuit comprises a first group comprising at least one DC power module, the first group having a first corresponding terminal and a second corresponding terminal; a second group comprising at least one DC power module, the second group having a first corresponding terminal and a second corresponding terminal; a configuration selection unit operatively connected to the first corresponding terminal of the first group, to the second corresponding terminal of the first group, to the first corresponding terminal of the second group and to the second corresponding terminal of the second group; wherein in a first configuration, the first corresponding terminal of the first group is operatively connected to the first corresponding terminal of the second group and the second corresponding terminal of the second group is operatively connected to the second corresponding terminal of the second group and a first given voltage is provided between the first corresponding terminal of the first group and the second corresponding terminal of the second group and further wherein in a second configuration, the second corresponding terminal of the first group is operatively connected to the first corresponding terminal of the second group and a second given voltage greater than the first given
(Continued)

voltage is provided between the first corresponding terminal of the first group and the second corresponding terminal of the second group.

13 Claims, 10 Drawing Sheets

(51) Int. Cl.
    *B60L 53/53*     (2019.01)
    *H02J 7/04*     (2006.01)
    *B60L 53/20*     (2019.01)
    *H02J 7/00*     (2006.01)
    *B60L 53/10*     (2019.01)
    *B60L 53/67*     (2019.01)

(52) U.S. Cl.
    CPC .......... *B60L 53/67* (2019.02); *H02J 7/00718* (2020.01); *H02J 7/007182* (2020.01); *H02J 7/045* (2013.01); *B60L 2240/527* (2013.01)

(56) References Cited

U.S. PATENT DOCUMENTS

| | | | |
|---|---|---|---|
| 7,135,836 B2* | 11/2006 | Kutkut | H02J 7/02 320/116 |
| 7,256,516 B2* | 8/2007 | Buchanan | H02J 1/14 307/62 |
| 8,890,474 B2* | 11/2014 | Kim | B60L 53/16 320/109 |
| 8,987,935 B2* | 3/2015 | King | B60L 58/22 307/10.1 |
| 9,337,657 B2* | 5/2016 | Wagoner | H02J 3/32 |
| 9,966,779 B2* | 5/2018 | Ziv | H05B 47/19 |
| 10,183,583 B2* | 1/2019 | Narla | B60L 8/003 |
| 10,224,827 B1* | 3/2019 | Zhu | H02M 3/285 |
| 10,283,965 B2* | 5/2019 | Dong | H02J 3/36 |
| 10,326,303 B2* | 6/2019 | Wang | H02J 9/08 |
| 10,434,886 B2* | 10/2019 | Anttonen | B60L 53/302 |
| 10,581,242 B2* | 3/2020 | Adelson | H02J 7/0013 |
| 10,744,883 B2* | 8/2020 | Quattrini, Jr | B60L 53/65 |
| 10,919,403 B2* | 2/2021 | Ge | H02J 7/00 |
| 2011/0260538 A1* | 10/2011 | Huang | H02J 9/062 307/64 |
| 2011/0285345 A1* | 11/2011 | Kawai | B60L 53/11 320/107 |
| 2011/0291616 A1* | 12/2011 | Kim | B60L 53/68 320/109 |
| 2019/0070971 A1* | 3/2019 | Kusumi | B60L 53/60 |
| 2020/0119653 A1* | 4/2020 | Mariethoz | H02M 3/33584 |

* cited by examiner

DUAL VOLTAGE RANGE CHARGING STATION

FIELD

The invention relates to an electric charging station with a DC output for recharging electric vehicle equipped with a DC charging outlet. More precisely, the invention pertains to a dual voltage range charging station for fast charging of electric vehicles and is applicable to a variety of models of electric vehicles, wherein some of these electric vehicles may have a DC battery voltage in the 200 V-500 V range, whereas some other of these electric vehicles may have a DC battery voltage in the 400 V-1000 V range. The invention concerns a DC fast charging station with an automatically configurable voltage range for accommodating both types of users while maintaining the same charging electrical power.

BACKGROUND

Providing charging stations for electric vehicles (EV) is very desirable.

Public charging stations with a DC output can be used for fast charging of electric vehicles having a DC charging outlet.

A wide variety of designs of electric vehicle is now available on the market.

Most of the electric vehicle concepts uses a lithium battery with a DC voltage varying between 200 V and 500 V. Users yet demand shorter time for filling up the batteries during the charging sessions. Shorter charging sessions are possible if the DC fast charger is designed to deliver higher electrical power to the electric vehicle battery. Shorter charging sessions are possible if the electric vehicle battery wiring and contactor are increased in size, in order to carry and handle a higher current value.

Very fast charging at low voltage entails high current, thick and heavy cables at the charging station side, significant heating of the station cables and de facto lowers of the mechanical flexibility of these cables.

To overcome this limitation, auto makers are now working on electric vehicles with a battery voltage in the range 400 V-1000 V, which will enable very fast charging with less battery current. However, no fast DC charger technology exists that can accommodate the 200 V to 500 V range as well as the 400 V to 1000 V range.

There is a need for a charging station that will overcome at least one of the above-identified drawbacks.

BRIEF SUMMARY

According to a first aspect there is provided a dual voltage range charging station comprising a first group comprising at least one DC power module, the first group having a first corresponding terminal and a second corresponding terminal; a second group comprising at least one DC power module, the second group having a first corresponding terminal and a second corresponding terminal; a configuration selection unit operatively connected to the first corresponding terminal of the first group, to the second corresponding terminal of the first group, to the first corresponding terminal of the second group and to the second corresponding terminal of the second group; wherein in a first configuration, the first corresponding terminal of the first group is operatively connected to the first corresponding terminal of the second group and the second corresponding terminal of the second group is operatively connected to the second corresponding terminal of the second group and a first given voltage is provided between the first corresponding terminal of the first group and the second corresponding terminal of the second group; and further wherein in a second configuration, the second corresponding terminal of the first group is operatively connected to the first corresponding terminal of the second group and a second given voltage greater than the first given voltage is provided between the first corresponding terminal of the first group and the second corresponding terminal of the second group According to an embodiment, at least one of the first group and the second group comprises more than one DC power module.

According to an embodiment, when the first group comprises more than one DC power modules, the more than one DC power modules of the first group are arranged in a parallel configuration.

According to an embodiment, when the second group comprises more than one DC power modules, the more than one DC power modules of the second group are arranged in a parallel configuration.

According to an embodiment, the configuration selection unit comprises a first switching unit operatively connected to the second corresponding terminal of the first group and to the first corresponding terminal of the second group; a second switching unit operatively connected to the second corresponding terminal of the first group and to the second corresponding terminal of the second group; a third switching unit operatively connected to the first corresponding terminal of the second group and to first corresponding terminal of the first group and wherein an actuation of the second switching unit and the third switching unit provides the first configuration and an actuation of the first switching unit provides the second configuration.

According to an embodiment, the configuration selection unit comprises a first single pole double throw device operatively connected to the first corresponding terminal of the second group and to a selected one of the first corresponding terminal of the first group and the second corresponding terminal of the first group and a second single pole double throw device operatively connected to the second corresponding terminal and to a selected one of the first corresponding terminal of the second group and the second corresponding terminal of the second group.

According to an embodiment, each of the at least one DC power module comprises an AC to DC converter having a DC output galvanically isolated from an AC input supply.

According to an embodiment, the dual voltage range charging station further comprises a charger main controller, for driving each of said first, second and third switching units in one of an ON state and an OFF state.

According to an embodiment, the charger main controller comprises at least one microprocessor, at least one serial communication link operatively coupled with the at least one microprocessor, wherein the at least one serial communication link is used for further transmitting commands to each of the at least one DC power module.

According to an embodiment, at least one of said first switching unit, said second switching unit and said third switching unit comprises Single Pole Single Throw contactor actuated by a coil.

According to an embodiment, at least one of said first switching unit, said second switching unit and said third switching unit comprises an electromechanical contactor.

According to an embodiment, at least one of the first single pole double throw device and the second single pole double throw device comprises a single pole double throw electromechanical contactor actuated by an electromagnetic coil and characterized by a Break-Before-Make behavior.

According to an embodiment, at least one of said first switching unit, said second switching unit and said third switching unit comprises a solid-state relay.

According to an embodiment, at least one of said first switching unit, said second switching unit and said third switching unit comprises a controllable semiconductor switch.

According to an embodiment, at least one of said first switching unit, said second switching unit and said third switching unit comprises a thyristor.

According to an embodiment, at least one of said first switching unit, said second switching unit and said third switching unit comprises a manually-actuated switch.

BRIEF DESCRIPTION OF THE DRAWINGS

In order that the invention may be readily understood, embodiments of the invention are illustrated by way of example in the accompanying drawings. In the drawings.

DETAILED DESCRIPTION

Figure 1A:
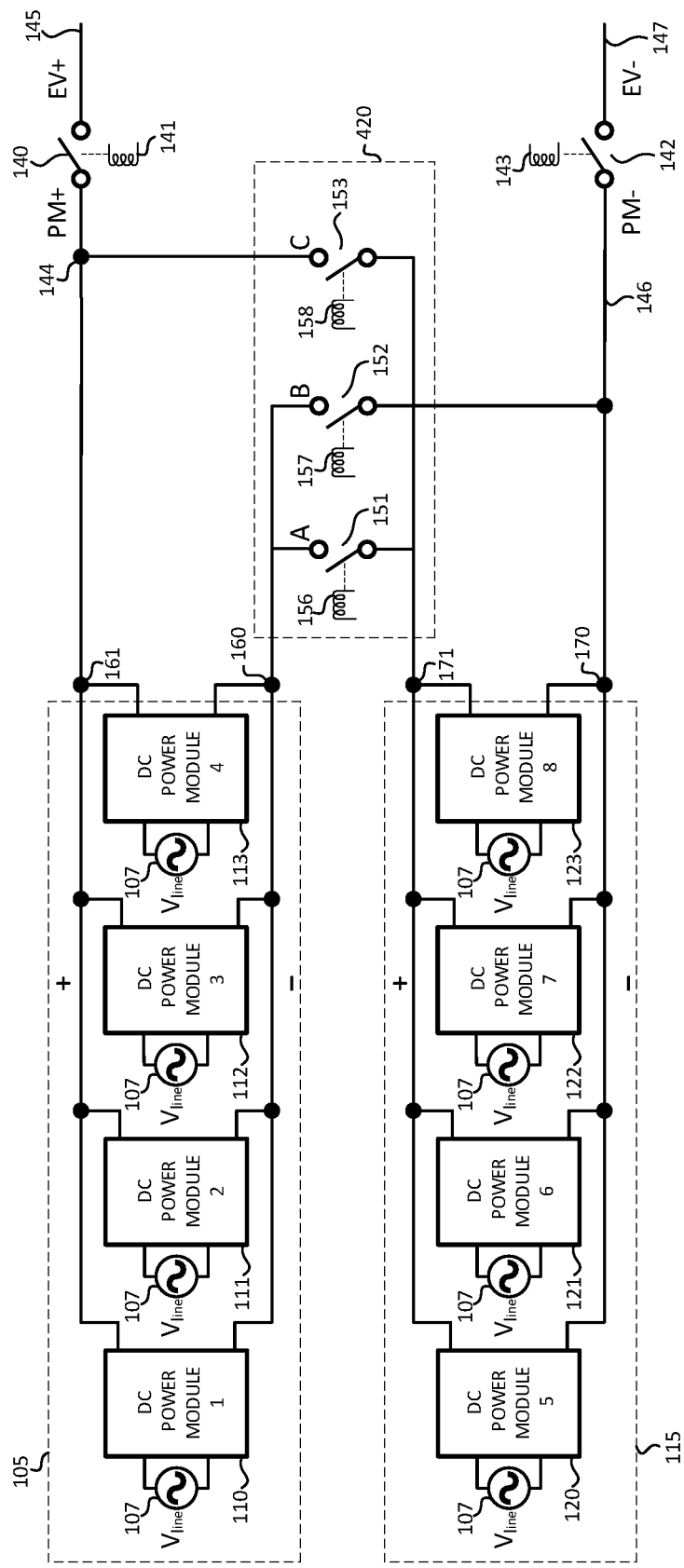
FIGS. 1a and 1b are electrical schematics which illustrate respectively a first and a second embodiment of the power circuit of an embodiment of a dual voltage range charging station.

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain. For example, in the sentence "the computer sends data (i.e., instructions) over the Internet," the term "i.e." explains that "instructions" are the "data" that the computer sends over the Internet.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a power circuit for a dual voltage range charging station and for a dual voltage range charging station, wherein the dual voltage range charging station has two possible DC voltage ranges: a first DC voltage range wherein n power modules are internally connected in parallel with n DC power modules, and a second DC voltage range, wherein n DC power modules are internally connected in series with n power modules.

More precisely, the power circuit of the dual voltage range charging station disclosed herein comprises a first group comprising at least one DC power module, the first group having a first corresponding terminal and a second corresponding terminal; a second group comprising at least one DC power module, the second group having a first corresponding terminal and a second corresponding terminal and a configuration selection unit operatively connected to the first corresponding terminal of the first group, to the second corresponding terminal of the first group, to the first corresponding terminal of the second group and to the second corresponding terminal of the second group. In a first configuration, the first corresponding terminal of the first group is operatively connected to the first corresponding terminal of the second group and the second corresponding terminal of the second group is operatively connected to the second corresponding terminal of the second group and a first given voltage is provided between the first corresponding terminal of the first group and the second corresponding terminal of the second group. In a second configuration, the second corresponding terminal of the first group is operatively connected to the first corresponding terminal of the second group and a second given voltage greater than the first given voltage is provided between the first corresponding terminal of the first group and the second corresponding terminal of the second group. Moreover, and in accordance with an embodiment, when the first group comprises more than one DC power modules, the more than one DC power modules of the first group are arranged in a parallel configuration. In accordance with another embodiment, when the second group comprises more than one DC power modules, the more than one DC power modules of the second group are arranged in a parallel configuration.

It will be appreciated, as further explained below, that the configuration selection unit comprises, in one embodiment, a first switching unit operatively connected to the second corresponding terminal of the first group and to the first corresponding terminal of the second group; a second switching unit operatively connected to the second corresponding terminal of the first group and to the second corresponding terminal of the second group; a third switching unit operatively connected to the first corresponding terminal of the second group and to first corresponding terminal of the first group. It will further be appreciated that an actuation of the second switching unit and the third switching unit provides the first configuration and an actuation of the first switching unit provides the second configuration.

It will be appreciated that in another embodiment, the configuration selection unit comprises a first Single-Pole-Double-Throw device operatively connected to the first corresponding terminal of the second group and to a selected one of the first corresponding terminal of the first group and the second corresponding terminal of the first group and a second Single-Pole-Double-Throw device operatively connected to the second corresponding terminal and to a selected one of the first corresponding terminal of the second group and the second corresponding terminal of the second group.

It will be appreciated that the switching unit may be selected from a group consisting of electromechanical contactors, solid-state relays, semiconductor switches, Single-Pole-Single-Throw (SPST) contactor switches, Single-Pole-Double-Throw electromechanical contactors actuated by an electromagnetic coil and characterized by a Break-Before-Make behavior, controllable semiconductor switches, thyristors and manually-actuated switches.

Now referring to FIG. 1a, it will be appreciated that each of two groups 105 and 115 of at least one DC power module contains a number n of DC power modules, wherein in the embodiment shown in FIG. 1a, the number n is equal to 4.

In fact, in this embodiment, the first group 105 comprises four DC power modules, respectively DC power module 110, DC power module 111, DC power module 112 and DC power module 113. The DC power module 110, the DC power module 111, the DC power module 112 and the DC power module 113 have their respective DC output electrically connected together in parallel, i.e., the positive DC output port of each of the power modules 110, 111, 112 and 113 are electrically connected together and the negative DC output port of each of the power modules 110, 111, 112 and 113 are electrically connected together.

In the embodiment disclosed in FIG. 1a with n=4, the second group 115 of at least one DC power module comprises four DC power modules, respectively DC power module 120, DC power module 121, DC power module 122 and DC power module 123. The DC power module 120, the DC power module 121, the DC power module 122 and the DC power module 123 have their respective DC output electrically connected together in parallel, i.e., the positive DC output port of each of the power modules 120, 121, 122 and 123 are electrically connected together and the negative DC output port of each of the power modules 120, 121, 122 and 123 are electrically connected together.

The total number of DC power modules is therefore 2n which, in the embodiment described in FIG. 1a, amounts to eight DC power modules 110, 111, 112, 113, 120, 121, 122, 123, which are all connected to the same single-phase AC voltage 107, which is the line voltage. It will be appreciated that in one embodiment at least one DC power module comprises an AC to DC converter having a DC output galvanically isolated from an AC input supply.

It will be further appreciated that in one embodiment of the invention, the line voltage 107 is 240 VAC/60 Hz. It will be further appreciated by the skilled addressee that, in an alternative embodiment of the invention, the line voltage is a three-phase voltage. In another alternative embodiment of the invention, the line voltage of the various DC power modules is single-phased with the various inputs electrically shifted by 120 degrees.

Still referring to FIG. 1a, it will be appreciated that the DC power module 113 converts an AC line voltage 107 into a DC voltage with 161 being its positive connection and 160 being its negative connection. Still in this embodiment, each of the other DC power modules 110, 111, 112 of the same first group 105 are also AC to DC converters with identical DC voltage output all having their positive outputs connected to point 161 and their negative outputs connected to point 160.

Similarly, the DC power module 123 converts the AC line voltage 107 into a DC voltage with point 171 being its positive connection and point 170 being its negative connection. The other DC power modules 120, 121, 122 of the same second group 115 of at least one DC power module are also AC to DC converters with identical DC voltage output, all having their positive outputs connected to point 171 and their negative outputs connected to point 170.

Still referring to FIG. 1a, a configuration selection unit 420 is illustrated, which comprises a switching unit A 151, a switching unit B 152 and a switching unit C 153. When all three switching units 151, 152, 153 are open, the first group 105 of at least one DC power module may generate a DC output voltage of different value than the voltage generated by the second group 115 of at least one DC power module.

It will be appreciated by the skilled addressee that changing the respective state of the switching units 151, 152, 153 will either establish a series electrical connection of the first group 105 of at least one DC power module and the second group 115 of at least one DC power module or a parallel connection of the first group 105 of at least one DC power module and the second group 115 of at least one DC power module.

Upon setting the switching unit 151 ON and the switching units 152, 153 OFF, a series connection is established, i.e., the first group 105 of at least one DC power module is connected in series with the second group 115 of at least one DC power module.

Upon setting the switching unit 151 OFF and the switching unit 152, 153 ON, a parallel connection is established, i.e., the first group 105 of at least one DC power module is connected in parallel with the second group 115 of at least one DC power module.

As an example, in one embodiment, each of the DC power modules 110, 111, 112, 113, 120, 121, 122, 123 delivers a maximum DC voltage up to 500 volts and a maximum DC current up to 35 amperes. The skilled addressee will appreciate that various alternative embodiments may be possible in the scope of this example. In the parallel connection configuration, i.e., when the switching unit 151 is ON and the switching units 152 and 153 are OFF, the dual voltage range charging station will supply, in one embodiment, a maximum DC current of 280 amperes and a maximum DC voltage of 500 V to fill up a low-voltage battery upon closing charger output contactors 140, 142.

In the same embodiment described previously, but with the configuration selection unit 420 set in a series configuration, i.e., when the switching unit 151 is OFF and the switching units 152 and 153 are both ON, the dual voltage range charging station will supply, in one embodiment, a maximum DC current of 140 amperes and a maximum DC voltage of 1000 V to fill up a high-voltage battery upon closing the charger output contactors 140, 142.

It will be appreciated by the skilled addressee that electric vehicles available on the market are provided with batteries with various voltage levels, and that public charging stations must interface with all of them with the highest efficiency possible and lowest cost of the charging infrastructure. It will also be appreciated that the availability of two voltage ranges provided by the power circuit of the dual voltage range charging station disclosed herein is of great advantage since it enables a flexibility for low-voltage/high-current batteries and for high-voltage/low-current batteries, whereas the DC power modules can be operated close to their nominal power in both cases, i.e., in each of the two voltage ranges which is of great advantage.

Figure 1B:
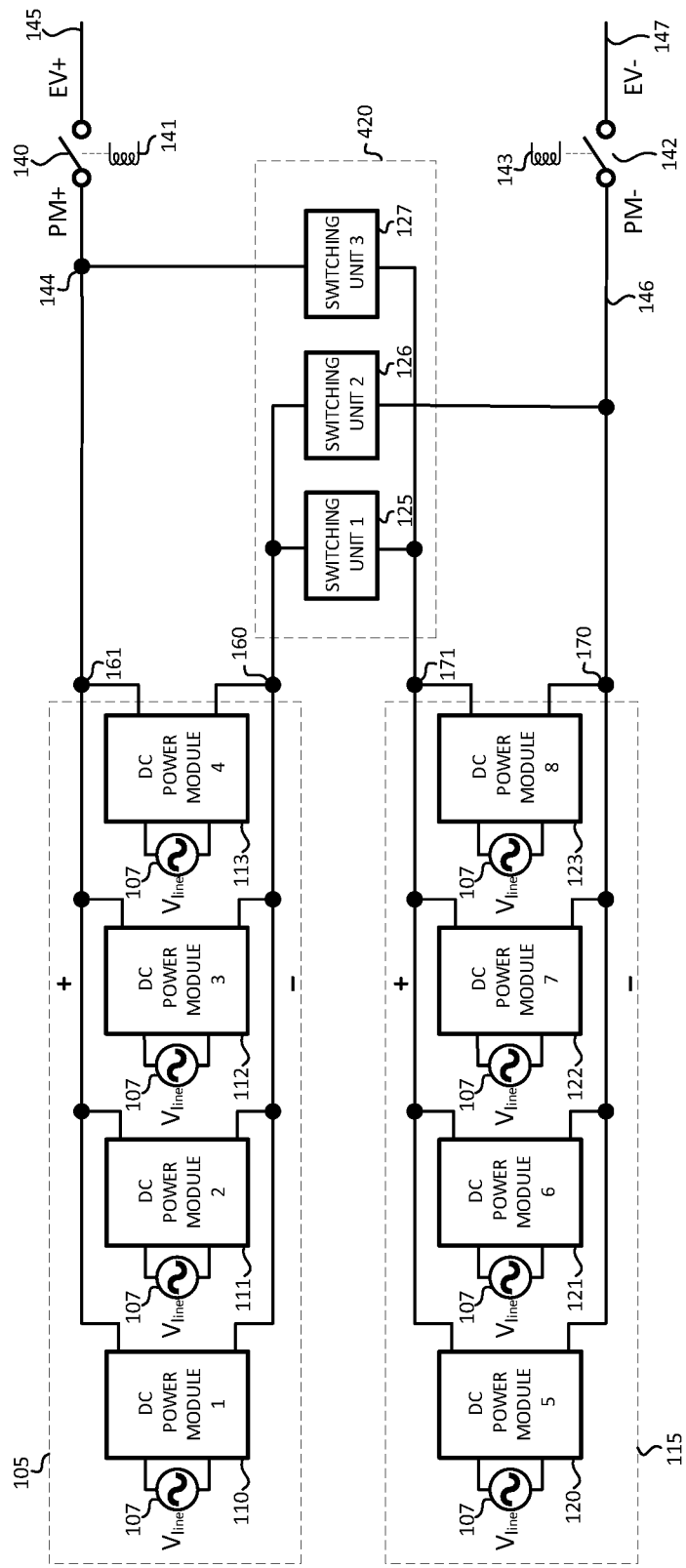

It will be appreciated by the skilled addressee that the three switching units 151, 152, 153 shown in FIG. 1a and FIG. 1b may be implemented using mechanical contactors, as shown in FIG. 1a, or according to various other embodiments such as for instance using semiconductor switches, thyristors, or manually actuated switches.

Now referring to FIG. 1b, it will be appreciated that the configuration selection unit 420 comprises the switching units 125, 126, 127. In this embodiment, the switching units 125, 126, 127 are generic switching devices. Those switching units may comprise mechanical contactors, semiconductor switches, thyristors or manually-actuated switches, or a combination thereof.

Figure 2:
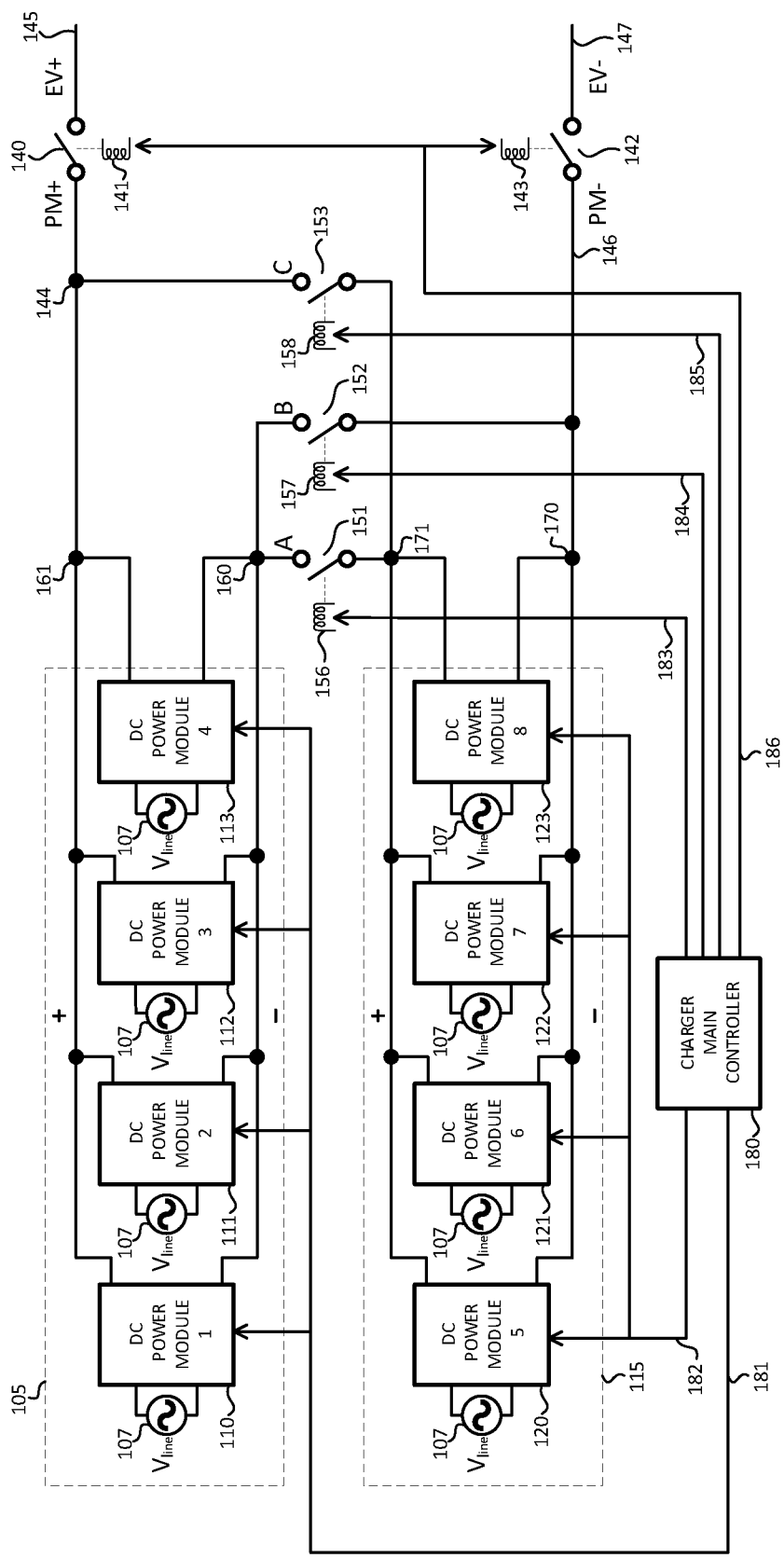
FIG. 2 is an electrical schematic which illustrates an embodiment of the power circuit with the control circuits of an embodiment of the dual voltage range charging station.

Now referring to FIG. 2, there is illustrated, inter alia, a charger main controller 180 with its control output ports 181, 182, 183, 184, 185 and 186. In one embodiment, the charger main controller 180 comprises a microprocessor mounted on a printed circuit board. The charger main controller 180 further comprises, in this embodiment, two serial digital communication links 181, 182. The serial digital communication link 181 transmits a reference voltage and a reference current to be enforced by all DC power modules in the first group 105 of at least one DC power module at their respective DC output ports. In one embodiment, the DC power modules 110, 111, 112, 113 of the first group 105 of at least one DC power module enforce a voltage with a value ranging between 200 VDC and 500 VDC, depending on a command signal received on the input digital communication link 181.

Similarly, the digital serial communication link 182 is used for transmitting the reference voltage and the reference current to be enforced by all the DC power modules of the second group 115 of at least one DC power module at their respective DC output ports. In one embodiment, the DC power modules 120, 121, 122, 123 of the second group 115 of at least one DC power module will enforce a voltage with a value ranging between 200 VDC and 500 VDC, depending on the command signal received on the input digital communication link 182.

While this has not been disclosed, it will be appreciated by the skilled addressee that the digital communication links 181 and 182 may be implemented using a variety of wired and wireless technologies. In one embodiment, the digital communication links 181 and 182 are implemented using two single-point to multi-point RS-485 wired communication links. In another embodiment, the technology used for the communication link uses the Universal Standard Bus (USB) standard. Moreover, the skilled addressee will appreciate that various embodiments may be possible for implementing the charger main controller 180.

It will be appreciated by the skilled addressee that the embodiment disclosed in FIG. 2 enables the voltage across circuit points 161 and 160, i.e., the voltage at the output of the DC power modules in the first group 105, to be different from the voltage across circuit points 171 and 170, i.e., the voltage at the output of the DC power modules in the second group 115 of at least one DC power module, depending on the charger main controller 180 control algorithms.

It will be also appreciated that the charger main controller 180 may also comprise in one embodiment an output stage having binary-state outputs, i.e., outputs that may either be in the HIGH or LOW state, for driving the switching units 151, 152, 153 individually in either the ON state or in the OFF state.

In one embodiment, the switching units 151, 152 and 153 comprise electromechanical contactors with their respective actuation coils 156, 157, 158. Still in this embodiment, the charger main controller 180 comprises a binary output line 183 connected to the actuator 156. By setting the binary output line 183 in the HIGH state, the actuator 156 is energized and the electromechanical contactor 151 is turned ON. In the same way, the output lines 157, 158 control the actuation of the switching units 152, 153 via the actuation coils 157 and 158.

It will be appreciated that the charger main controller 180 also comprises a binary output line 186, for driving the charger output contactors 140, 142 in either the ON state or in the OFF state. By setting the output binary output line 186 in the HIGH state, the actuators 141, 143 are energized and the contactors 140, 142 are turned ON. By closing the charger output contactor 140, an electrical connection is established between Power module positive output PM+, also referred to as circuit point 144, and the positive terminal of the electric vehicle charging outlet EV+, also referred to as circuit point 145. The same operation applies to the output contactor 142, wherein an electrical connection is established between the Power module negative output PM−, also referred to as circuit point 146, and the negative terminal of the electric vehicle charging outlet EV−, also referred to as circuit point 147.

Figure 3:
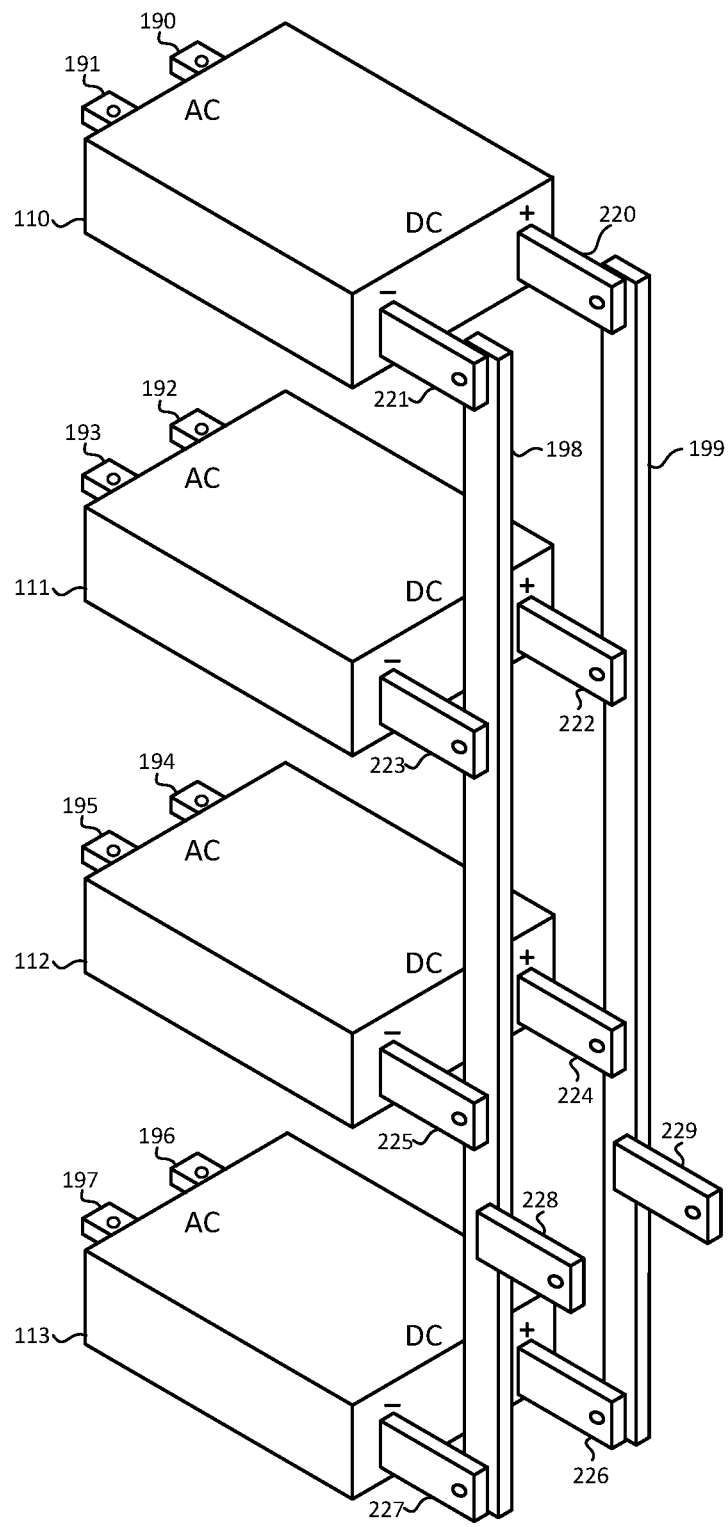
FIG. 3 is a diagram which illustrates a set of four DC power modules with their respective DC outputs connected in parallel according to one embodiment of the invention, wherein the quantity n, i.e the number of DC power modules per group, is equal to 4.

Now referring to FIG. 3, there is shown an embodiment of the first group 105 of at least one DC power module, wherein the first group 105 comprises a quantity n=4 of DC power modules identified respectively 110, 111, 112, 113 in FIG. 3. It will be appreciated that in one embodiment, all the DC power modules of a given group of at least one DC power module, e.g. the first group 105 of at least one DC power module, in the embodiment disclosed in FIG. 3, are electrically connected together using bus bars 198 and 199 which may be made of a material selected in a group consisting of copper, aluminum or any other suitable metallic material. Still referring to FIG. 3, it will be appreciated that this electrical connection is achieved, according to this embodiment, by connecting the positive DC power outputs 220, 222, 224, 226 of the DC power modules 110, 111, 112, 113 to the bus bar 199 and by connecting the negative DC power outputs 221, 223, 225, 227 of the DC power modules 110, 111, 112 and 113 to the bus bar 198.

The skilled addressee will appreciate that alternative embodiments may be possible for interconnecting the DC power modules 110, 111, 112, 113, such as for instance by replacing the bus bar 198 with flexible copper wires attached to the negative DC power outputs 221, 223, 225, 227 using attaching means selected, in one embodiment, from a group consisting of lugs, screws and nuts. The skilled addressee will appreciate that various alternative embodiments may be possible.

In the embodiment shown in FIG. 3, the first group 105 of at least one DC power module comprising the four DC power modules 110, 111, 112, 113 provides two connection posts and more precisely a negative connection post 228 and a positive connection post 229, which form the points of electrical connection for the first group 105. The positive connection post 229 disclosed in FIG. 3 is also represented as circuit point 161 in the electrical schematic of FIG. 1. In the same way, the negative connection post 228 disclosed in FIG. 3 is represented as circuit point 160 in the electrical schematic of FIG. 1.

Input ports 190 and 191 of the DC power module 110 serve as the 60 Hz or 50 Hz AC voltage input coming from the utility power line. Input ports 192 and 193 serve the same function for the DC power module 111.

Figure 4A:
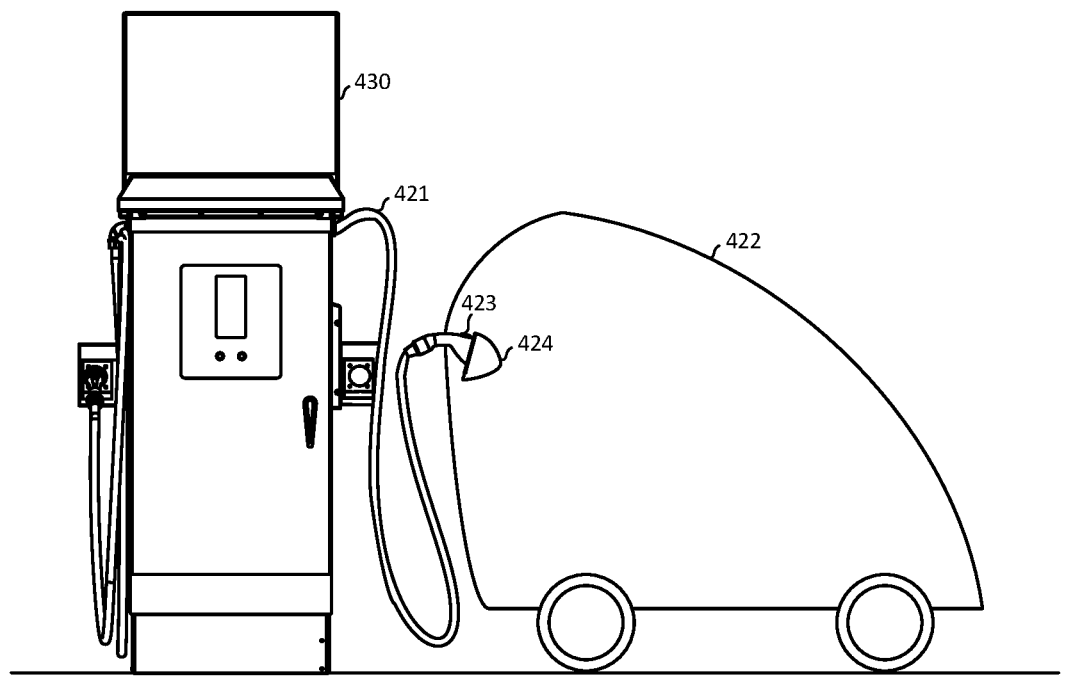
FIGS. 4a and 4b are diagrams wherein each of which illustrates an embodiment of a dual voltage range charging station which comprises an embodiment of the power circuit and wherein the dual voltage range charging station is connected to an electric vehicle.
Figure 4B:
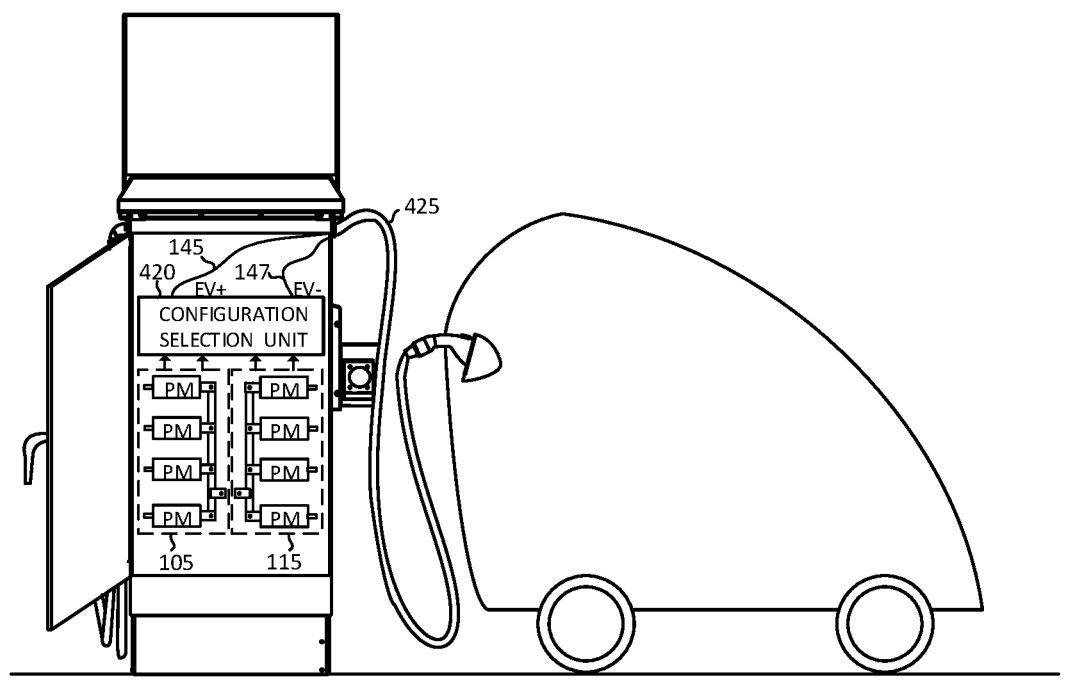

The implementation of the DC power modules in a typical embodiment is displayed in FIGS. 4a and 4b, wherein FIG. 4a illustrates, inter alia, a cabinet 430 of a dual voltage range charging station connected to an electric vehicle 422 using a power cable assembly 421, with a front door of the cabinet 430 closed. FIG. 4b illustrates the same dual voltage range charging station with the front door of the cabinet 430 open. It will be appreciated that in FIG. 4b, the first group 105 of at least one DC power module and the second group 115 of at least one DC power module are positioned inside the cabinet 430, each of the first group 105 of at least one DC power module and the second group 115 of at least one DC power module comprising four DC power modules. It will be appreciated that a configuration selection unit 420 comprises the three switching units A 151, B 152, C 153 shown in FIG. 1 and the charger output contactors 140 and 142.

The skilled addressee will appreciate that the charger output terminals EV+ and EV−, respectively labeled 145 and 147 pass through the cabinet enclosure 430 and run along to a charger connector 423 through a power cable assembly 425 inside a protecting jacket made of flexible material, as known to the skilled addressee.

Figure 5:
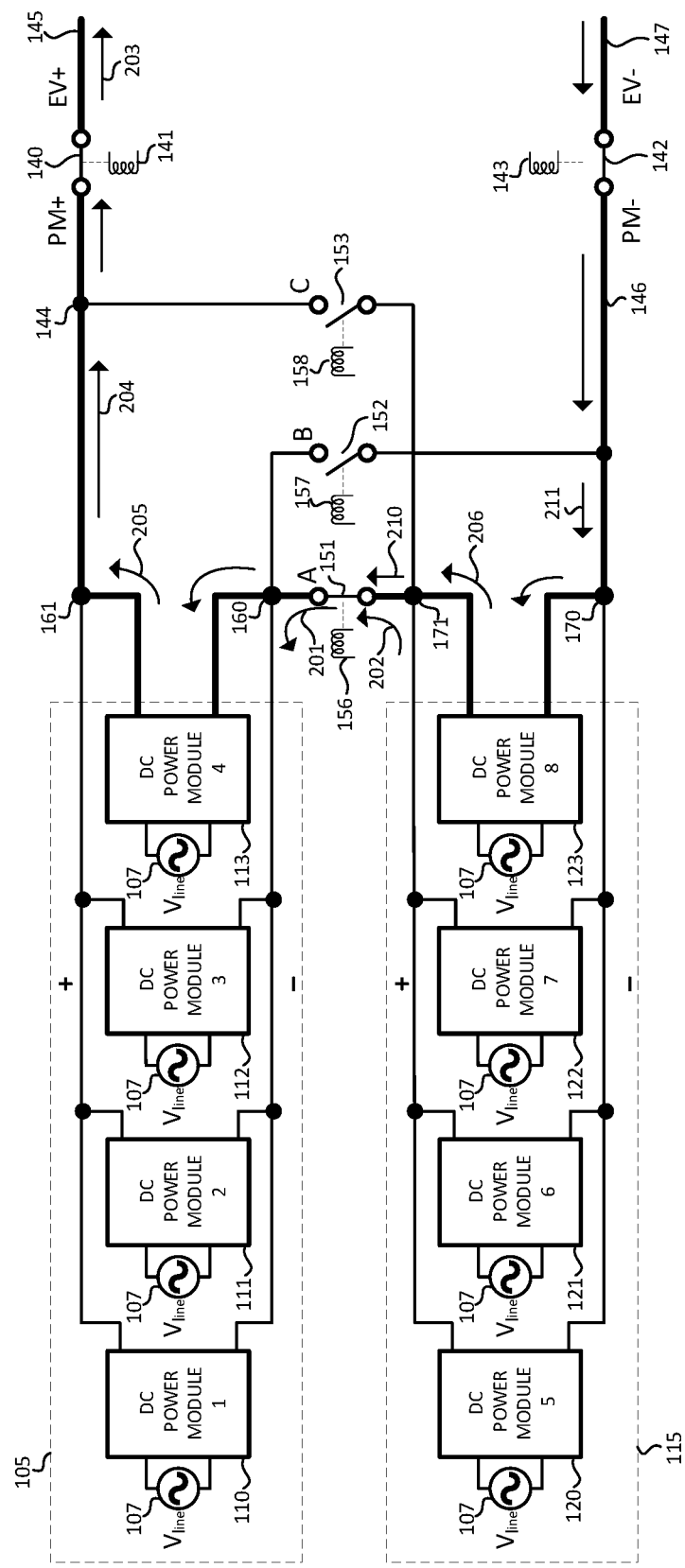
FIG. 5 is an electrical schematic which illustrates a flow of current in one embodiment of the power circuit of the dual voltage range charging station comprising 8 DC power modules, wherein the DC power modules numbered 1 to 4 are connected in series with the DC power modules numbered 5 to 8, and further wherein the switching units A, B, C are configured with their respective status CLOSED, OPEN, OPEN.

The electrical schematic of FIG. 5 illustrates the operation of the power circuit of a dual voltage range charging station in a series configuration. In this first configuration, the switching unit A 151 is closed, whereas the switching units B 152 and C 153 are open. The charging voltage received at the vehicle side is the voltage difference between EV+ (circuit point 145) and EV− (circuit point 147). In this series configuration, the negative output terminals of the DC power modules 110, 111, 112, 113 in the first group 105 of at least one DC power module are electrically connected to the positive ports of all the DC power modules 120, 121, 122, 123 of the second group 115 of at least one DC power module. In this first configuration, the charging current 203 received at the vehicle battery has the same value as the current flowing through the switching unit A 151.

In the series configuration presented in FIG. 5, the charging current 203 received at the vehicle is also equal to the total current 204 supplied by the first group 105 of at least one DC power module and also equal to the total current 206 supplied by the second group 115 of at least one DC power module.

Figure 6:
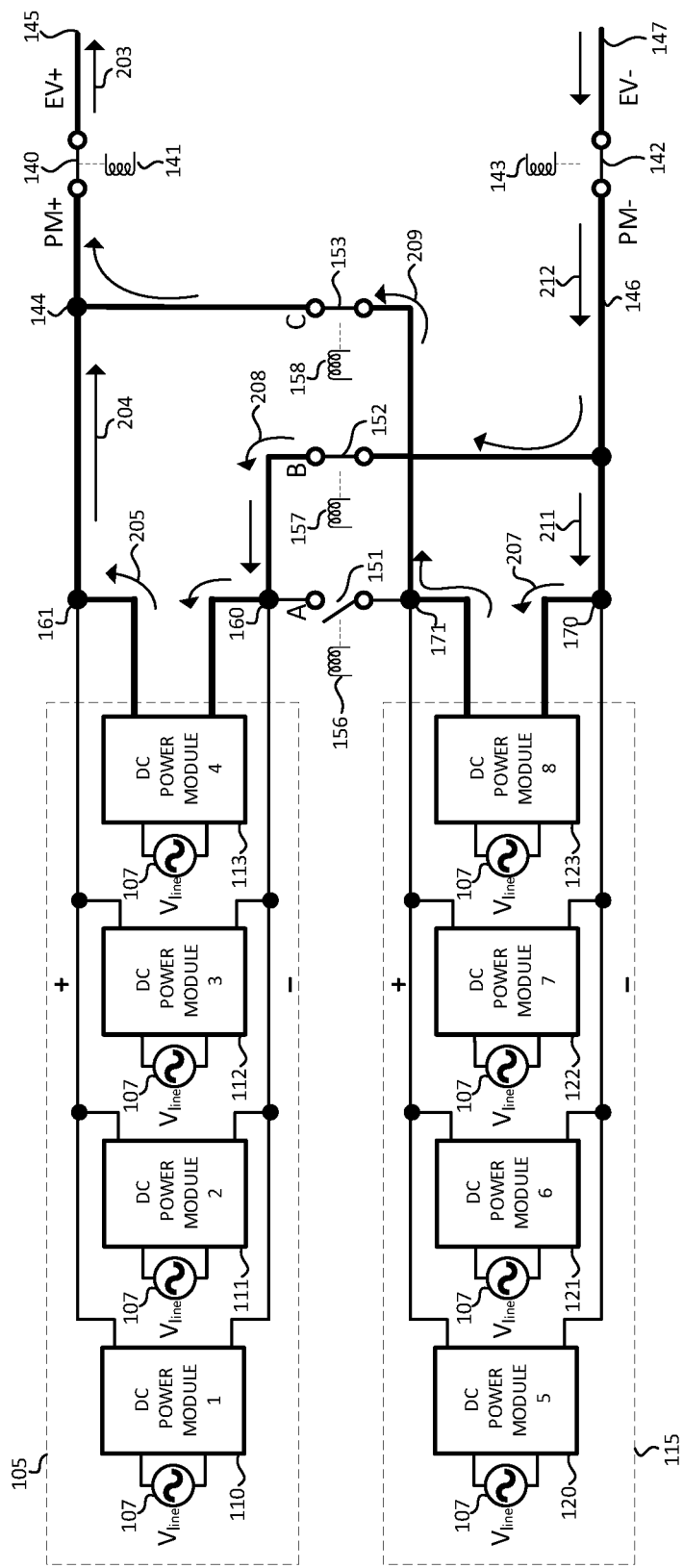
FIG. 6 is an electrical schematic which illustrates a flow of current in an embodiment of the power circuit of the dual voltage range charging station with 8 DC power modules, wherein the DC power modules numbered 1 to 4 are connected in parallel with the DC power modules numbered 5 to 8, and further wherein the switching units A, B, C are configured with their respective status OPEN, CLOSED, CLOSED.

Now referring to FIG. 6, there is illustrated the operation of the power circuit of a dual voltage range charging station in a parallel configuration. In that second configuration, the switching unit A 151 is open, whereas the switching units B 152 and C 153 are closed. In this parallel configuration, the positive output ports of the DC power modules 110, 111, 112, 113 in the first group 105 of at least one DC power module are electrically connected to the positive output terminals of the DC power modules 120, 121, 122, 123 in the second group 115 of at least one DC power module. In the same way, the negative output ports of all DC power modules 110, 111, 112, 113 in the first group 105 of at least one DC power module are electrically connected to the negative output terminals of the DC power modules 120, 121, 122, 123 in the second group 115 of at least one DC power module.

The charging current 203 received at the vehicle battery is equal to the sum of the current 204 produced by the DC power modules of the first group 105 of at least one DC power module and the current 209 produced by the DC power modules of the second group 115 of at least one DC power module. The skilled addressee will appreciate that while the electrical schematics shown in FIGS. 5 and 6 comprise eight DC power modules, any number of DC power modules may be used in an alternative embodiment.

Figure 7:
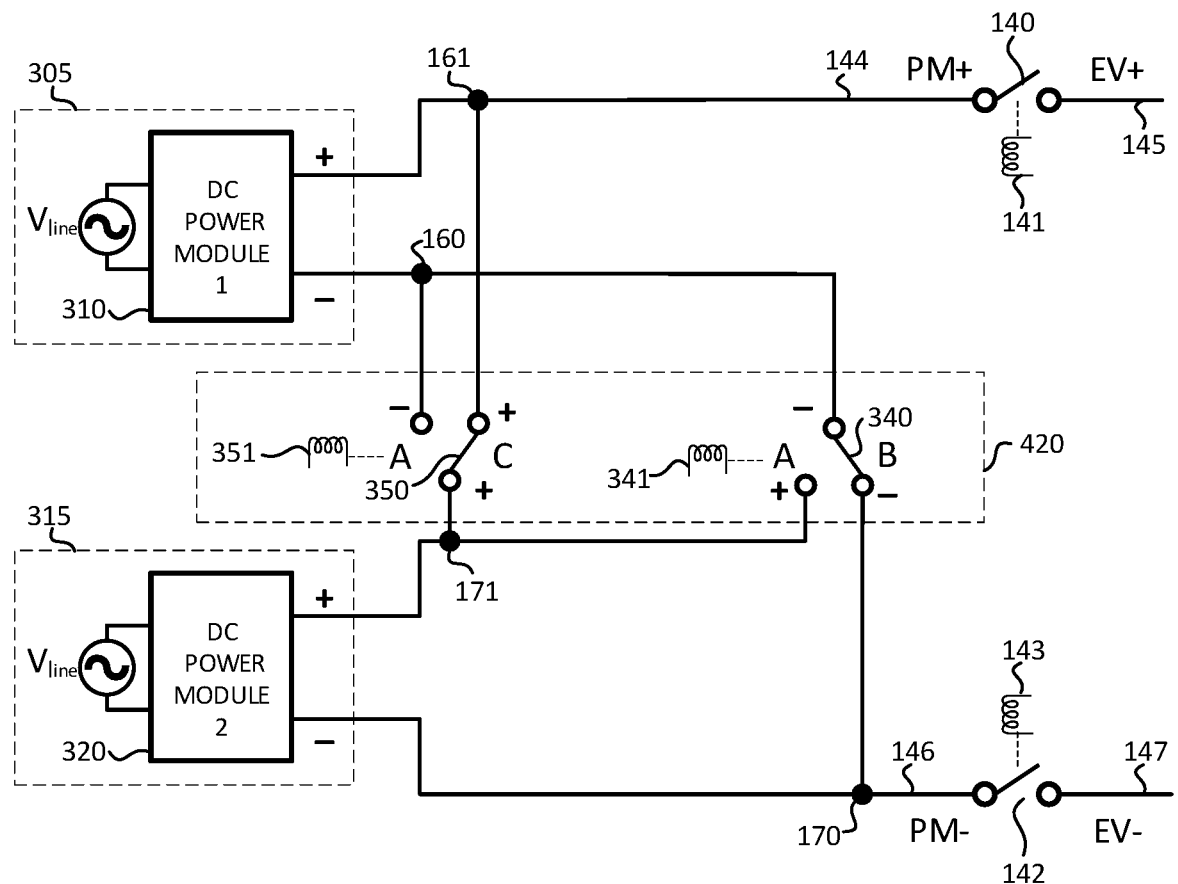
FIG. 7 is an electrical schematic which illustrates an embodiment of the power circuit of an embodiment of the dual voltage range charging station, wherein the power circuit comprises 2 DC power modules, and further wherein the switching units A, B, C are implemented using two Single-Pole-Double-Throw (SPDT) mechanical contactors.
Figure 8:
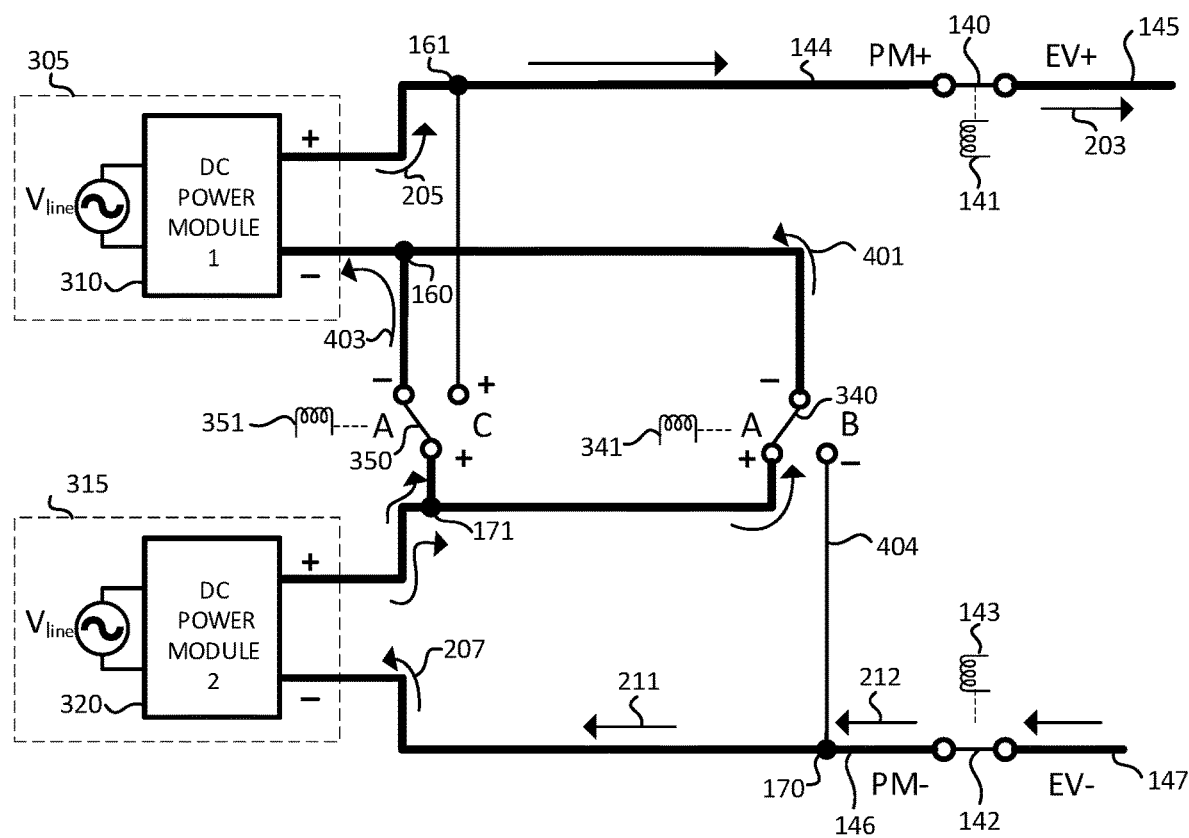
FIG. 8 is an electrical schematic which illustrates a flow of current in an embodiment of the power circuit of an embodiment of the dual voltage range charging station, wherein the power circuit comprises 2 DC power modules, further wherein the power module number 1 is connected in series with the power module number 2, and further wherein the switching units A, B, C are implemented using two Single-Pole-Double-Throw switches configured in such a manner that the switching unit A is CLOSED, the switching unit B is OPEN and the switching unit C is OPEN.
Figure 9:
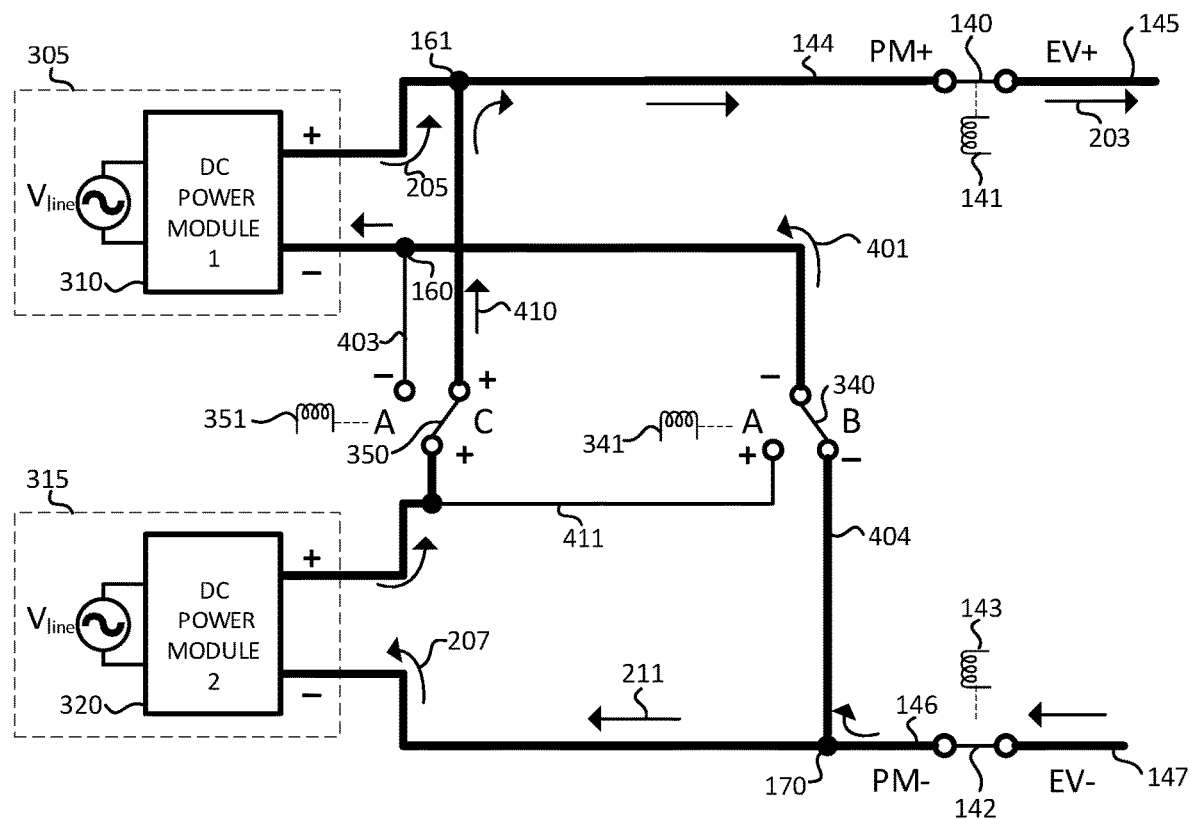
FIG. 9 is an electrical schematic which illustrates a flow of current in an embodiment of the power circuit of an embodiment of the dual voltage range charging station, wherein the power circuit comprises 2 DC power modules, wherein the DC power module number 1 is connected in parallel with the power module number 2, and further wherein the switching units are implemented using two Single-Pole-Double-Throw switches configured in such a manner that the switching unit A is OPEN, the switching unit B is CLOSED and the switching unit C is CLOSED.

It will be appreciated that, in one embodiment illustrated in FIG. 7, the configuration selection unit 420 comprises two Single-Pole-Double-Throw switches 340, 350. The electrical diagram of FIG. 7 serves two purposes: the first being the illustration of an embodiment wherein two Single-Pole-Double-Throw switches are included; the second purpose being the inclusion of a quantity $2n$ of DC power modules equal to 2, i.e., n=1. In the embodiment shown in FIG. 1 to FIG. 6, eight DC power modules are used to describe the invention. The skilled addressee will appreciate that any alternative number of DC power modules may be used, as shown in FIG. 7 to FIG. 9 for instance.

The first group 305 displayed in FIG. 7 comprises one DC power module 310, whereas the second group 315 comprises one DC power module 320. In the embodiment displayed in FIG. 7, each of the two Single-Pole-Double-Throw switches 340, 350 has two positions available. Single-Pole-Double-Throw switch 340 may be moved from position A to position B, whereas Single-Pole-Double-Throw switch 350 may be moved between position A and position C.

In the embodiment which uses the two Single-Pole-Double-Throw switches 340, 350, the first group 305 of DC power modules 305 is electrically connected in series with the second group 315 of DC power modules by switching the Single-Pole-Double-Throw switch contactor 340 to the A position and by switching the Single-Pole-Double-Throw switch contactor 350 to the A position.

Still in this embodiment, a second configuration is achievable, wherein the first group 305 of at least one DC power module is electrically connected in parallel with the second group 315 at least one DC power module by switching the Single-Pole-Double-Throw switch contactor 340 to the B position, whereas the Single-Pole-Double-Throw switch contactor 350 is switched to the C position.

The skilled addressee will appreciate that FIG. 8 and FIG. 9 illustrate the flow of current in the two Single-Pole-Double-Throw switches 340, 350 in each of the series and parallel configurations.

In FIG. 8, the series configuration is implemented, with the resulting charging voltage being the sum of the two DC voltages produced by the DC power modules 310 and 320. It will be appreciated that the charging current 203 is equal to the current 205 flowing through the DC power module 310 and also equal to the current 207 flowing through the DC power module 320. In this series configuration, the charging current is separated in two current paths in the Single-Pole-Double-Throw switches 340 and 350.

In FIG. 9, the parallel configuration is implemented, with the resulting charging current 203 being the sum of the two DC currents 205 and 207 produced by the DC power module 310 and 320. It will be appreciated that the charging voltage 203 is equal to the DC voltage output of DC power module 310 and also equal to the DC voltage output produced by the DC power module 320. In this parallel configuration, the charging current will be separated into two current paths in the Single-Pole-Double-Throw switches 340 and 350, whereas the current 205 flows through contact B of the Single-Pole-Double-Throw switch 340 and the current 207 flows through contact C of the Single-Pole-Double-Throw switch 350.

The skilled addressee will appreciate that alternative embodiments with other combinations of switches are possible, e.g., the switch 340 may be a Single-Pole-Single-Throw switch and the switch 350 may be a Single-Pole-Double-Throw switch.

The invention claimed is:

1. A power circuit for a dual voltage range charging station, said power circuit comprising:
   a first group comprising at least one DC power module, the first group having a first corresponding terminal and a second corresponding terminal;
   a second group comprising at least one DC power module, the second group having a first corresponding terminal and a second corresponding terminal;
   a configuration selection unit operatively connected to the first corresponding terminal of the first group, to the second corresponding terminal of the first group, to the first corresponding terminal of the second group and to the second corresponding terminal of the second group; wherein the configuration selection unit comprises a first single pole double throw device operatively connected to the first corresponding terminal of the second group and to a selected one of the first corresponding terminal of the first group and the second corresponding terminal of the first group; and a second single pole double throw device operatively connected to the second corresponding terminal and to a selected one of the first corresponding terminal of the second group and the second corresponding terminal of the second group;
   wherein in a first configuration, the first corresponding terminal of the first group is operatively connected to the first corresponding terminal of the second group and the second corresponding terminal of the second group is operatively connected to the second corresponding terminal of the second group and a first given voltage is provided between the first corresponding terminal of the first group and the second corresponding terminal of the second group; and
   further wherein in a second configuration, the second corresponding terminal of the first group is operatively connected to the first corresponding terminal of the second group and a second given voltage greater than the first given voltage is provided between the first corresponding terminal of the first group and the second corresponding terminal of the second group.

2. The power circuit for a dual voltage range charging station as claimed in claim 1, wherein at least one of the first group and the second group comprises more than one DC power modules.

3. The power circuit for a dual voltage range charging station as claimed in claim 2, wherein when the first group comprises more than one DC power modules, the more than one DC power modules of the first group are arranged in a parallel configuration.

4. The power circuit for a dual voltage range charging station as claimed in claim 3, wherein when the second group comprises more than one DC power modules, the more than one DC power modules of the second group are arranged in a parallel configuration.

5. The power circuit for a dual voltage range charging station as claimed in claim 1, wherein each of the at least one DC power module comprises an AC to DC converter having a DC output galvanically isolated from an AC input supply.

6. The power circuit for a dual voltage range charging station as claimed in claim 1, wherein the dual voltage range charging station further comprises a charger main controller, for driving said first single pole double throw device and said second single pole double throw device.

7. The power circuit for a dual voltage range charging station as claimed in claim 6, wherein the charger main controller comprises at least one microprocessor, at least one serial communication link operatively coupled with the at least one microprocessor, wherein the at least one serial communication link is used for further transmitting commands to each of the at least one DC power module.

8. The power circuit for a dual voltage range charging station as claimed in claim 1, wherein at least one of the first single pole double throw device and the second single pole double throw device comprises a single pole double throw electromechanical contactor actuated by an electromagnetic coil and characterized by a Break-Before-Make behavior.

9. The power circuit for a dual voltage range charging station as claimed in claim 1, wherein at least one of said first single pole double throw device and said second single pole double throw device comprises a solid-state relay.

10. The power circuit for a dual voltage range charging station as claimed in claim 1, wherein at least one of said first single pole double throw device and said second single pole double throw device comprises a controllable semiconductor switch.

11. The power circuit for a dual voltage range charging station as claimed in claim 10, wherein at least one of said first single pole double throw device and said second single pole double throw device comprises a thyristor.

12. The power circuit for a dual voltage range charging station as claimed in claim 1, wherein at least one of said first single pole double throw device and said second single pole double throw device comprises a manually-actuated switch.

13. A dual voltage range charging station comprising the power circuit as claimed in claim 12.

* * * * *